(12) United States Patent
Leong et al.

(10) Patent No.: US 10,691,674 B2
(45) Date of Patent: Jun. 23, 2020

(54) DISTRIBUTED SYSTEM FOR ANIMAL IDENTIFICATION AND MANAGEMENT

(71) Applicant: Accenture Global Solutions Limited, Dublin (IE)

(72) Inventors: Chit Wah Christine Leong, Houston, TX (US); Alexandra Theresa Ashpole, Sunnyvale, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/559,285

(22) Filed: Sep. 3, 2019

(65) Prior Publication Data

US 2020/0159720 A1 May 21, 2020

Related U.S. Application Data

(60) Provisional application No. 62/768,491, filed on Nov. 16, 2018.

(51) Int. Cl.
*G06F 16/23* (2019.01)
*A01K 11/00* (2006.01)
*G06F 21/60* (2013.01)
*G06F 21/62* (2013.01)
*H04L 9/08* (2006.01)

(52) U.S. Cl.
CPC ........ *G06F 16/2365* (2019.01); *A01K 11/008* (2013.01); *G06F 21/602* (2013.01); *G06F 21/6209* (2013.01); *H04L 9/0866* (2013.01)

(58) Field of Classification Search
CPC ............ G06F 16/2356; G06F 21/6209; G06F 21/602; H04L 9/0866
See application file for complete search history.

(56) References Cited

U.S. PATENT DOCUMENTS

2017/0180134 A1* 6/2017 King ..................... H04L 9/3239
2017/0331810 A1* 11/2017 Kurian .................. H04L 63/083
(Continued)

OTHER PUBLICATIONS

Tian, F., Jun. 2016. An agri-food supply chain traceability system for China based on RFID & blockchain technology. In 2016 13th international conference on service systems and service management (ICSSSM) (pp. 1-6). IEEE. (Year: 2016).*
(Continued)

*Primary Examiner* — Robert B Leung
(74) *Attorney, Agent, or Firm* — Harrity & Harrity, LLP

(57) ABSTRACT

A platform may receive, from a user device, a request for a status of an animal, wherein the request includes animal identification information associated with the animal. The platform may identify, based on receiving the request, an animal record identifier associated with the animal. The platform may verify that an entity associated with the user device is authorized to obtain the status of the animal, wherein the entity is one of a plurality of entities that are authorized to obtain the status of the animal. The platform may identify, based on verifying that the entity is associated with the user device, blocks of a blockchain that include the animal record identifier. The platform may determine the status of the animal from animal records associated with the animal, wherein the animal records are included within the blocks. The platform may provide, to the user device, the status of the animal.

20 Claims, 10 Drawing Sheets

(56) References Cited

U.S. PATENT DOCUMENTS

| | | | |
|---|---|---|---|
| 2019/0008117 A1* | 1/2019 | Dijkstra | A61B 34/30 |
| 2019/0053470 A1* | 2/2019 | Singh | A01K 29/005 |
| 2019/0096534 A1* | 3/2019 | Joao | H04L 65/403 |
| 2019/0180275 A1* | 6/2019 | Safak | G06Q 20/3825 |
| 2019/0220854 A1* | 7/2019 | Pesci | G06Q 20/0658 |
| 2019/0335715 A1* | 11/2019 | Hicks | H04L 9/3239 |
| 2020/0043001 A1* | 2/2020 | Ng | G06Q 20/401 |

OTHER PUBLICATIONS

Lin, J., Shen, Z., Zhang, A. and Chai, Y., Jul. 2018. Blockchain and iot based food traceability for smart agriculture. In Proceedings of the 3rd International Conference on Crowd Science and Engineering (p. 3). ACM. (Year: 2018).*

"A guide to blockchain and data protection". Hogan Lovells. Sep. 2017. Accessed at [https://www.hlengage.com/_uploads/downloads/5425GuidetoblockchainV9FORWEB.pdf] on Oct. 31, 2019. (Year: 2017).*

Voshmgir, S. and Kalinov, V. Sep. 30, 2017. Blockchain: A Beginners Guide. Blockchain Hub. (Year: 2017).*

Yaga, D. et al. Oct. 2018. Blockchain Technology Overview. NISTIR 8202. (Year: 2018).*

Tripoli, M. & Schmidhuber, J. Aug. 2018. Emerging Opportunities for the Application of Blockchain in the Agri-food Industry. FAO and ICTSD: Rome and Geneva. Licence: CC BY-NC-SA 3.0 IGO (Year: 2018).*

Pawtocol, "The World's Most Advanced Pet Community", https://pawtocol.com, 2018, 17 pages.

Kerry Halladay, "What is blockchain", Mar. 5, 2018, https://www.wlj.net/top_headlines/what-is-blockchain/article_9a57d0a2-1e56-11e8-b1ab-5bc37e7407ce.html, 7 pages.

O'Brien, "The Beef Blockchain", 2018, 5 pages.

* cited by examiner

US 10,691,674 B2

DISTRIBUTED SYSTEM FOR ANIMAL IDENTIFICATION AND MANAGEMENT

RELATED APPLICATION(S)

This application claims priority to U.S. Provisional Patent Application No. 62/768,491, filed on Nov. 16, 2018, entitled "BLOCKCHAIN FOR ANIMAL IDENTIFICATION AND HEALTH MANAGEMENT," the content of which is incorporated by reference herein in its entirety.

BACKGROUND

Animals serve many purposes in the world, such as maintaining ecosystems, providing resources (e.g., consumable resources, power resources, transportation resources, and/or the like), enabling sport (e.g., hunting, training, racing, and/or the like), being comrades/companions (e.g., as pets), etc. Accordingly, in some instances, to ensure that certain animals are fit for one or more of these purposes, characteristics (e.g., health, location, migration routes/patterns, cost, populations, and/or the like) of the animals may be determined and/or estimated.

SUMMARY

According to some implementations, a method may include receiving event information, wherein the event information is associated with an event involving an animal, and wherein the event information is received from a user device; obtaining, based on receiving the event information, animal identification information for the animal, wherein the animal identification information comprises at least one of: a biometric signature of the animal, or a microchip identification number associated with a microchip of the animal; determining an animal record identifier for the animal, wherein the animal record identifier is determined based on the animal identification information; generating an animal record associated with the event, wherein the animal record is generated using a private key, wherein the private key certifies that the animal record is associated with the user device, and wherein the animal record identifies information associated with a status of the animal according to the event; configuring authorization settings for the animal record, wherein the authorization settings permit a plurality of authorized entities to access the animal record; and causing the animal record to be stored in a distributed ledger system, wherein the distributed ledger system includes a plurality of animal records associated with a plurality of animals, and wherein one or more of the plurality of animal records are accessible to the plurality of authorized entities.

According to some implementations, a device may include one or more memories; and one or more processors, communicatively coupled to the one or more memories, configured to: receive event information associated with an event involving an animal; identify, based on receiving the event information, animal identification information for the animal, wherein the animal identification information is received in association with the event information; determine, based on the animal identification information, an animal record identifier for the animal; generate an animal record associated with the event to indicate a status of the animal according to the event; and cause the animal record to be stored in a distributed ledger system, wherein the distributed ledger system includes a plurality of animal records associated with a plurality of animals, and wherein one or more of the plurality of animal records are accessible to a plurality of entities.

According to some implementations, a non-transitory computer-readable medium may store one or more instructions. The one or more instructions, when executed by one or more processors of a device, may cause the one or more processors to: receive, from a user device, a request for a status of an animal, wherein the request includes animal identification information associated with the animal; identify, based on receiving the request, an animal record identifier associated with the animal, wherein the animal record identifier is obtained based on the animal identification information; verify that an entity associated with the user device is authorized to obtain the status of the animal, wherein the entity is one of a plurality of entities that are authorized to obtain the status of the animal; identify, based on verifying that the entity is associated with the user device, blocks of a blockchain that include the animal record identifier; determine the status of the animal from animal records associated with the animal, wherein the animal records are included within the blocks; and provide, to the user device, the status of the animal.

DETAILED DESCRIPTION

Figure 1A:
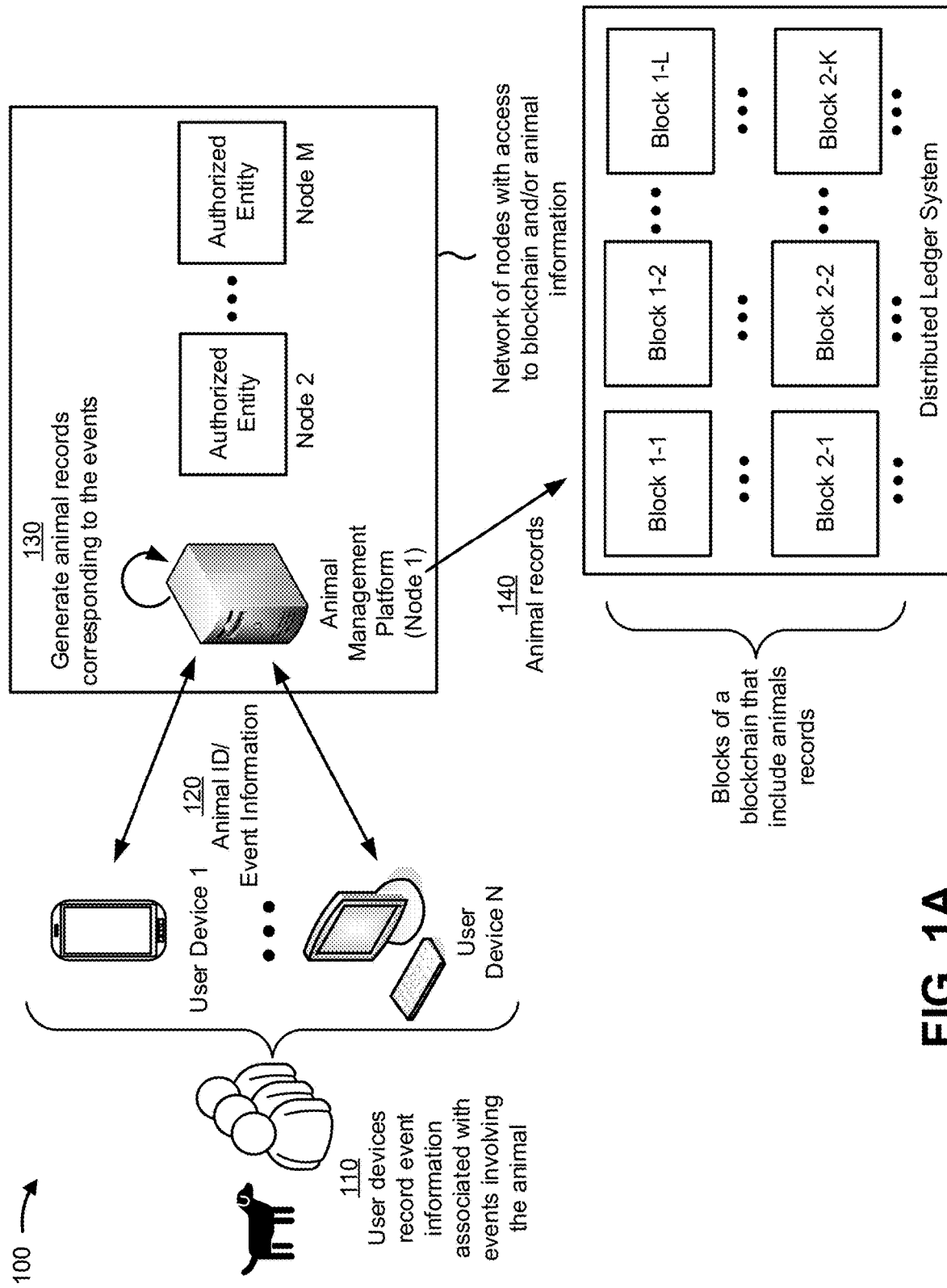
FIGS. 1A, 1B, and 2-4 are diagrams of one or more example implementations described herein.

The following detailed description of example implementations refers to the accompanying drawings. The same reference numbers in different drawings may identify the same or similar elements.

In many instances, animals (e.g., pets, wild animals, stray animals, and/or the like) are monitored for one or more purposes. For example, the health of a pet may be monitored to ensure a healthy life that is both rewarding for the pet and for a guardian or owner of the pet. One or more characteristics of wild animals may be monitored (e.g., migration patterns, breeding, eating habits, and/or the like) for research purposes and/or to enhance an ecosystem associated with the wild animals. Furthermore, the health and/or raising of livestock may be monitored for quality, certification (e.g., certified organic, genetic traits for breeding, and/or the like), and/or the like to ensure that the livestock are properly treated, properly classified, and/or the like. However, previous techniques for managing and/or maintaining certain information associated with an animal might only enable access to that information via a single source. For example, that source may include a particular secure platform or database that is owned and/or operated by an entity associated with the animal when the information was generated and/or stored (e.g., an owner of the animal, a research entity, a veterinarian, a shelter, and/or the like).

Therefore, according to such previous techniques, it is not possible for an entity to identify a status of the animal, based on certain information, unless the entity has access to that single source of information because the animal cannot communicate such information (e.g., in the event that the animal is to receive treatment, be transported to a new location, live with a new owner, and/or the like). More specifically, unless the entity can communicate with every individual or organization that monitored the health of the animal (e.g., that provided or maintained information associated with the animal's treatment, vaccination, diet, and/or the like), that monitored the location of the animal (e.g., based on migration, travel, transportation, and/or the like), and/or the like, the entity may not be able to accurately determine a status and/or a complete history (e.g., health history, location history, dietary history, and/or the like) of the animal. Therefore, according to previous techniques, it is not likely that complete historical information, associated with an animal, that is distributed across multiple platforms and/or managed by multiple entities can be obtained for an animal. In some instances, even if certain information can be obtained, there is a chance that the information is unreliable, inaccurate, and/or untrustworthy (e.g., due to a source of the information, due to the information being insecure, due to the information being corrupted, due to accuracy with which the information was generated, and/or the like). Furthermore, even if such information can be obtained, there is a likelihood that the information may not be obtained within a short enough time period to properly treat an animal, process information associated with an animal (e.g., to permit the animal to travel, move to a new home, be adopted, and/or the like), and/or the like. For example, near real-time information may be required to treat an injured animal before permanent injury or death to the animal. Therefore, according to previous techniques, information associated with managing animals may be haphazard, redundant, inaccessible, unavailable when needed, etc., which can lead to a waste of resources (e.g., computing resources, network resources, and/or the like), inefficient use of resources, and/or the like.

According to some implementations described herein, a distributed ledger system may be used to accurately and/or securely identify animals and/or manage historical information associated with the animals (e.g., health records, travel/transportation history, and/or the like), thus providing information that is uniform, not redundant, accessible, available when needed, trustworthy, etc., which leads to avoiding wasted resources, efficient use of resources, and/or the like. For example, the animal management platform may manage animal records using a distributed ledger of a DLS. According to some implementations, the distributed ledger may enable a network of nodes, that have access to the distributed ledger, to access the animal records. The network of nodes may correspond to one or more devices associated with one or more entities (e.g., devices owned, operated, and/or maintained by entities) that are authorized to access or are capable of accessing the distributed ledger. In some implementations, the network of nodes may have various levels of access capabilities that may permit the network of nodes to view (e.g., read the distributed ledger) and/or update (e.g., write to the distributed ledger) animal records in the distributed ledger. In this way, the animal management platform provides accessibility (e.g., to any authorized entity, from any device capable of accessing the distributed ledger, regardless of time, location, and/or the like) to information in the distributed ledger.

Furthermore, the animal management platform may use the distributed ledger to secure the information associated with animals. For example, the distributed ledger may be immutable, such that no entity can edit, revise, and/or update an entry in the distributed ledger. For example, the distributed ledger may be a blockchain. In such cases, an animal record may be implemented via a plurality of blocks linked together in the blockchain. For example, a new transaction may be added to a block of the blockchain for an animal record when an event involving an animal occurs. In this way, animal records can be secured in the distributed ledger while providing transparency of a history of the animal.

In some implementations, the distributed ledger may store hundreds, thousands, millions, or more animal records associated with hundreds, thousands, millions, or more animals and/or groups of animals. Additionally, or alternatively, the distributed ledger may store hundreds, thousands, millions, or more animal records associated with hundreds, thousands, millions, or more animals or groups of animals that are associated with hundreds, thousands, or more entities. As described herein, the animal management platform may process hundreds, thousands, millions, or more transactions for animal records (e.g., corresponding to newly received event information for animal records in the distributed ledger). In this way, the animal management platform, using the distributed ledger, enables management of a plurality of animal records, regardless of the quantity of the plurality of animal records.

As described herein, to identify and/or provide information associated with an animal and/or a status of an animal, the animal management platform may look up transactions in the distributed ledger that include a particular animal record identifier. Accordingly, the distributed ledger may provide a scalable structure that is used to identify an animal (e.g., using a mapping of the animal record identifier to animal identification information for the animal, such as a biometric signature, a microchip number of a microchip in the animal, and/or the like) and enable one or more entities (that may be distributed nationally, globally, and/or the like) to determine the status of the animal. Accordingly, the animal management platform may avoid wasting resources associated with managing animal records (e.g., because the animal records are not in relatively inaccessible databases) by enabling the animal records to be accessible to any authorized entities capable of accessing the distributed ledger. Furthermore, the animal management platform may ensure efficient use of resources (e.g., data storage resources) by increasing accessibility of the animal information. Moreover, the animal management platform, as described herein, removes complexity with respect to communicating and/or distributing the information by serving as a centralized platform that enables on-demand, distributed, remote, and/or scalable access to the information.

Animals may be considered unique in that the animals are not subject to privacy laws and can be considered as property. Accordingly, while certain information associated with humans may not be shared across various platforms or entities without the consent of the humans (or guardians for the humans), in most instances, corresponding information associated with animals (e.g., identifications, health records, locations or location history, and/or the like) may be shared freely across different domains, platforms, and/or entities without the consent of the animals, unless owners of the animals maintain such information as private. For example, because animals cannot provide consent with respect to sharing information (e.g., if an owner of the animal is unknown and/or does not exist), because animals may be considered property of one or more humans, and/or the like, such information can be made publicly available in the interest of other entities that may benefit from such information (e.g., a shelter knowing whether an animal has an owner and/or whether the animal has been vaccinated, a transportation entity knowing whether the animal has been in certain compromised or unhealthy regions of the world, an insurance provider knowing whether the animal has been accurately and certifiably diagnosed with a disease, and/or the like). Therefore, it is of interest that certain information be accessible to authorized entities to ensure that the animal receives proper care, is properly evaluated, is certified with a particular status, and/or the like in certain corresponding situations.

Furthermore, because animals may be considered to have value (e.g., monetary value, intrinsic value, holistic value, sentimental value, and/or the like), some implementations described herein provide a robust and accurate data structure for storage and sharing of information associated with animals that can be made accessible to any authorized entity that has interest in monitoring the animal, knowing the status of the animal, or knowing the history of the animal. Accordingly, using the animal management platform, described herein, an animal may be properly treated and/or processed by enabling an authorized entity to accurately and completely assess the status of the animal and/or the history of the animal.

Figure 1B:
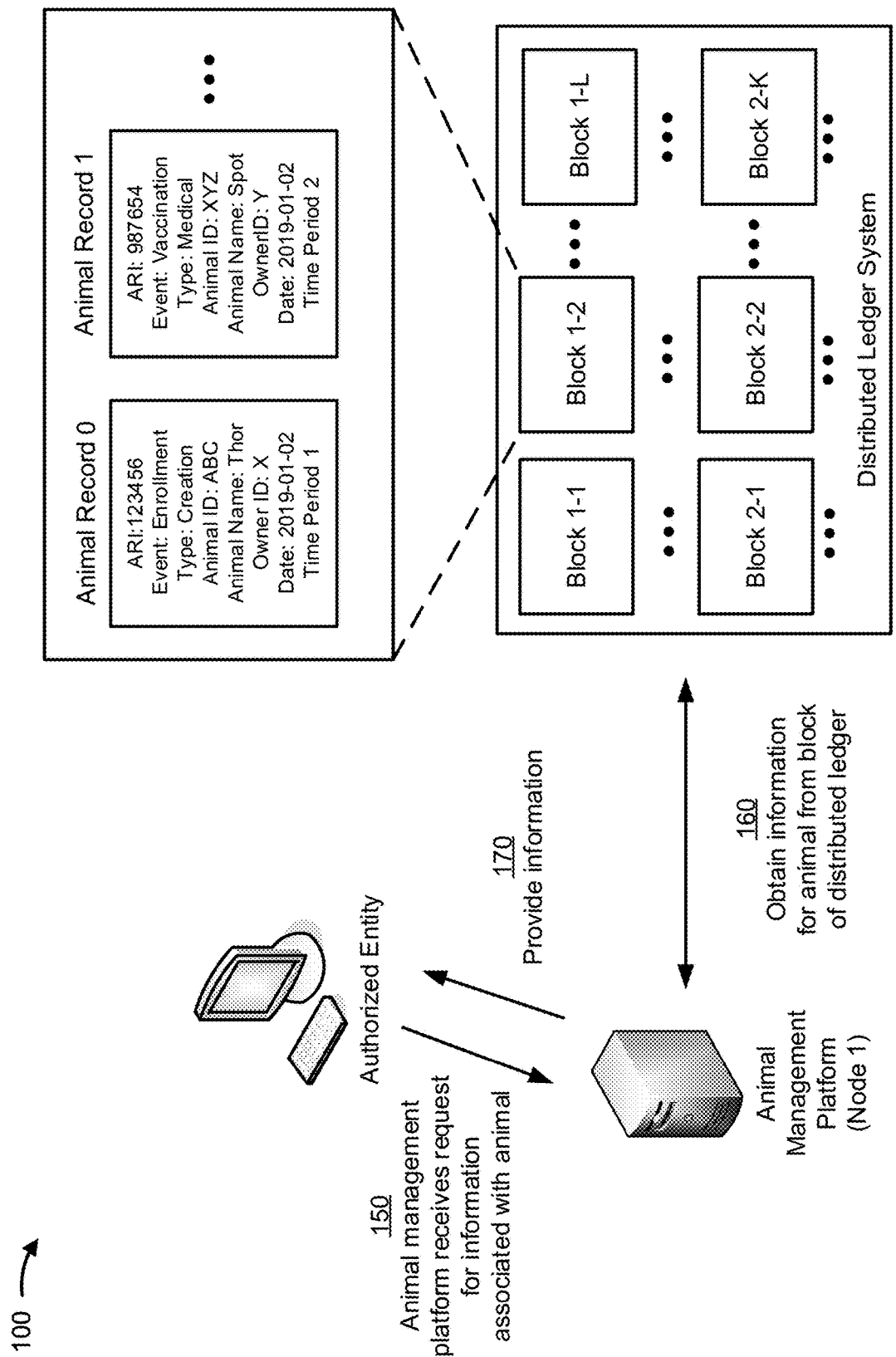

FIGS. 1A and 1B are diagrams of an example implementation 100 described herein. Example implementation 100 may include one or more user devices (shown as User Device 1 through User Device N) (which may be referred to herein individually as a "user device" and collectively as "user devices") associated with one or more users (referred to individually as a "user" and collectively as "users"), a network of nodes (shown as an animal management platform (serving as Node 1) and authorized entities (serving as Node 2, . . . , Node M), and a distributed ledger system. As shown, the distributed ledger system may include a distributed ledger, such as a blockchain. As described herein, information associated with an animal in example implementation 100 can be stored via the distributed ledger, managed by the animal management platform, and/or accessed by one or more authorized entities in the network of nodes. Although some example implementations are described herein with respect to a single animal, other examples may involve a group of animals (e.g., a herd, a flock, and/or the like) that are to be similarly managed.

As shown in FIG. 1A, the distributed ledger may be implemented by and/or include a blockchain. Accordingly, the animal management platform may use the blockchain to manage animal records for the animal (or a plurality of animals). Such animal records may include event information associated with events involving the animal. In such cases, each block of the blockchain may contain information associated with one or more animal records (e.g., created via one or more corresponding transactions involving the blockchain) that involve one or more animals. For example, the one or more animal records in each block may have been generated and/or stored within a particular time period (e.g., in association with events that occurred within a similar time period). As described herein, a transaction within a block may include an identifier associated with the animal (referred to herein as an "animal record identifier"), information associated with an update to the status of the animal (e.g., a health status, a location status, an ownership status, and/or the like), and/or a date associated with the status of the animal. In some implementations, the information identifying the update to the status of the animal may include or indicate the status of the animal, an address (or other data structure location information) that is associated with a location of a document or data that includes the status of the animal, a hash of the status of the animal, and/or the like.

As shown in FIG. 1A, and by reference number 110, the user devices record event information associated with events involving the animal. For example, a user may use an application (e.g., a mobile application, a computer application, a web-based application, and/or the like) via a user device to record the event information by providing a user input to the application. In some implementations, the event information may be recorded using a camera associated with the user device. Further, the application may be configured to provide time and/or location information associated with the user device when the user records the event information.

In some implementations, the user devices may operate without any user interaction. For example, the user devices may include and/or be implemented by one or more image capture devices (e.g., a camera) and/or Internet of Things (IoT) devices capable of detecting an event involving the animal, recording event information associated with the event, and providing (e.g., via a communication device and/or network) the event information to the animal management platform. For example, the user devices may include or be implemented by cameras that are remotely set up to automatically capture (e.g., using motion sensors, temperature sensors, infrared sensors, and/or the like) and/or provide images of the animal (e.g., in the wild, on a farm, within a nature preserve, and/or the like). Additionally, or alternatively, the user devices may include or be implemented by radio frequency identification (RFID) tag readers that are set up to detect the presence of the animal at a particular location. Accordingly, the user devices may be any suitable devices that can receive, capture, and/or store event information associated with an event involving an animal.

The users (and/or the user devices) may record event information for various types of events. Such events may include registering the animal with the animal management platform (e.g., to create an account for the animal), updating a status of the animal, and/or the like. Additionally, or alternatively, an event involving the animal may include a medical treatment event (e.g., a vaccination, a surgery, and/or the like), a feeding event, a breeding event, a transportation event (e.g., travel involving public transportation, a jurisdictional border crossing, a migration, and/or the like), a transfer of ownership, and/or the like. Accordingly, the events may take place at various times, for various events, over the course of the life of the animal.

As described herein, events involving the animal may occur at various locations. For example, the events may occur at various geographic locations, including locations in the wild and/or human inhabited and/or human operated locations (e.g., buildings, farms, zoos, preserves, and/or the like). Further, the events may involve various types of users. Such users may include current owners of the animals, prospective owners of the animals, researchers, veterinarians, representatives of transportation entities (e.g., entities capable of enabling or preventing transportation involving animals), insurance providers (e.g., entities capable of authorizing and/or providing insurance funds for veterinary care), real estate entities (e.g., entities capable of enabling animals to be housed in real estate, preventing animals from being housed in real estate, limiting access to real estate, and/or the like), and/or the like.

Event information may identify one or more characteristics of the event. For example, the event may identify a time of the event, a location of the event, an entity associated with the event, a type of event, and/or the like. Furthermore, the event information may include one or more event descriptions that are to be recorded in association with the event to permit the users to include details of the event in a corresponding animal record. As examples, such event descriptions may include results of a medical treatment, prescribed medications as a result of the medical treatment, consumed food during a feeding, identifications of partners during a breeding event, types of transportation used during a travel or transportation event, transportation providers and/or service providers during a transportation event, a sale value of the animal during a transfer of ownership, and/or the like.

In this way, event information associated with an animal may be generated by users and/or provided, via the user devices, to the animal management platform to permit the event information to be managed by the animal management platform, as described herein.

As further shown in FIG. 1A, and by reference number 120, the animal management platform receives animal identification information (shown as "Animal ID") and/or event information from the user devices. The animal management platform may receive the animal identification information and/or the event information based on the user devices capturing and/or receiving the event information. Additionally, or alternatively, the animal management platform may be configured to receive event information from the user devices according to a schedule (e.g., periodically).

In some implementations, the animal identification information and the event information may be received separately. For example, the animal management platform may receive the animal identification information and/or the event information via a series of communications (e.g., requests, messages, and/or the like) from the user devices. More specifically, the animal management platform may receive a request to generate an animal record for an event involving the animal. Based on receiving the request, the animal management platform may reply with one or more requests that the user device provide the animal identification information and/or the event information.

In some implementations, an animal may be identified according to one or more features of the animal and/or identification techniques. For example, the animal may be tagged with a chip (e.g., with an RFID tag, and/or the like) ("chipped") that indicates a microchip identification number assigned to the animal. In some implementations, the animal identification information may include a microchip identification number. For example, if the animal includes a microchip (e.g., embedded within the animal, attached to the animal, and/or the like), the microchip identification number may be a serial number of the microchip (and/or other unique identifier of the microchip). In some implementations, the event may involve the animal receiving the microchip (e.g., when the animal is being registered with the animal management platform, if the animal does not include a microchip, and/or the like).

Additionally, or alternatively, the animal identification information may include a biometric signature of the animal. For example, the biometric signature may be generated from one or more biometrics of the animal. The biometric signature may be generated according to any suitable biometric processing of biometric data associated with the biometrics of the animal. For example, the biometric data may include image data (e.g., that is representative of one more images of the animal), audio data (e.g., that is representative of a sound emitted by the animal), scanner data (e.g., that is representative of a fingerprint, a paw print, and/or the like).

In some implementations, the animal identification information may include the biometric data (e.g., the application and/or user device may be used to capture an image of the animal, record a sound from the animal, and/or the like). In such cases, the animal management platform may perform the biometric processing to determine a corresponding biometric signature of the animal. For example, an image analysis that uses feature recognition may be performed to identify one or more unique features or biometric signatures of the animal (e.g., body part features (e.g., face, footprint, pawprint, hoofprint, and/or the like), a gait, sounds (e.g., animal vocalizations/calls), and/or the like). Additionally, or alternatively, a deoxyribonucleic acid (DNA) analysis of the animal may be performed to identify the animal based on a DNA sequence of the animal, and/or the like. One or more signatures and/or identifications may be used to identify an animal and/or generate a unique identifier of the animal (e.g., using a hash function and the identifiers). Accordingly, such identification techniques may be used as the animal identification information (which may correspond to a signature or hash, for the animal, generated from the one or more identification techniques) for the animal that may be used to identify animal records associated with the animal. Therefore, when an authorized entity (e.g., an individual, such as a veterinarian, or an organization, such as a governmental entity, travel entity, housing entity, and/or the like) is interested in determining the status of the animal, the authorized entity may look up the status of the animal in the distributed ledger using the animal identification information, as described herein.

According to some implementations, the animal identification information for a particular animal may be representative of a particular group of animals. For example, when a particular event involves an animal identified by a particular microchip number, the animal record may be representative of a group of animals (e.g., herd, flock, and/or the like) associated with that animal.

In some implementations, the animal management platform may use a machine learning model, such as an animal identification model to identify an animal. For example, the animal management platform may train the animal identification model based on one or more parameters associated with identifying or classifying the animal, identifying or classifying an animal associated with or related to the animal (e.g., same species, family, and/or the like), identifying or classifying an animal that is not associated with the animal, and/or the like. Such parameters may include one or more biometric signatures of identified animals, sizes of identified animals, locations of identified animals, identification information (chip identifications) of identified animals, ownership status of identified animals, whether the animals are domestic or wild, uses for the animals (e.g., pets, food, recreation/amusement, and/or the like), and/or the like. The animal management platform may train the animal identification model using historical data associated with identifying or classifying one or more animals according to the one or more parameters. Using the historical data and the one or more parameters as inputs to the animal identification model, the animal management platform may identify the animal to permit one or more transactions associated with the animal to be accessible to an entity and/or indicate a status of the animal.

Additionally, or alternatively, where the biometric data includes image data, video data, and/or the like, the animal management platform may use a computer vision technique, such as a convolutional neural network technique to assist in classifying biometric data (e.g., data relating to particular body parts of particular animals) into a particular class (e.g., a class indicating that the biometric is associated with a particular animal and/or animal species, a class indicating that the biometric is not associated with a particular animal and/or animal species, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like. In this way, the animal management platform may use any suitable artificial intelligence and/or data processing techniques to receive, identify, and/or determine animal identification information for the animal.

As an example of one or more communications involving the animal management platform receiving animal identification information and/or event information, a user may create a profile for the animal on an application of one of the user devices. The application may be used to send a request to the animal management platform to create an animal record for the animal according to a particular event (e.g., register a new animal, record a medical care, indicate the presence of the animal at a particular location, and/or the like). In such a case, the animal management platform may establish a communication link with the application of the user device and request and/or receive animal identification information (e.g., a chip number, a biometric, and/or the like) for the animal. The animal management platform may then use the animal identification information to identify animal records associated with the animal (e.g., by mapping the animal identification information to an animal record identifier associated with the animal).

In this way, the animal management platform may receive, from a plurality of various users, event information associated with events involving the animal, which is identified by animal identification information associated with the animal. The received animal identification information and/or the event information permits the animal management platform to generate corresponding animal records for the animal based on the events described in event information.

As further shown in FIG. 1A, and by reference number 130, the animal management platform generates animal records corresponding to the events. The animal records may be generated based on receiving the animal identification information and/or the event information. In some implementations, the animal records may include the animal identification information and/or the event information.

In some implementations, the animal management platform may perform a lookup of the animal identification information to identify an animal record identifier associated with the animal. For example, the animal management platform may maintain a mapping of animal identification information to corresponding animal record identifiers for animals that are registered with the animal management platform. In such cases, if the animal management platform determines that an animal record identifier does not exist for the animal, the animal management platform may generate a unique animal record identifier for the animal and map the animal identification information for the animal to the unique animal record identifier. Additionally, or alternatively, the animal management platform may create an account for the animal using the animal record identifier. For example, the animal record identifier may be used to identify the account and/or effectively register the animal with the animal management platform. According to some implementations, the animal record identifier may be included within animal records to permit the animal records to be identified within the distributed ledger (e.g., during a search of the distributed ledger to identify information associated with the animal).

In some implementations, if an animal record identifier does not exist for the animal, the animal management platform may request additional information associated with the animal and/or the user that is providing the event information to register the animal (e.g., create an account for the user). For example, if the user is an owner of the animal, the animal management platform may request identification information, contact information, and/or the like for an account of the user to enable the user to continue to interact with and/or utilize the animal management platform. In some implementations, the animal management platform may maintain such user information separately from the animal record (e.g., to maintain privacy of the user).

According to some implementations, the animal management platform may provide the animal record identifier to the user device to permit the user device (and/or an application of the user device) to use the animal record identifier in addition to, or as an alternative to, the animal identification information for the animal. In some implementations, the animal management platform (e.g., in response to a request from an application on the user device), may request that one or more details associated with the animal be provided after an account for the animal (and/or user) is created. For example, the animal management platform may have a minimum amount of information (e.g., location, species, physical characteristics, and/or the like) that is required in order to fully register an account for the animal. Accordingly, the user, via the user device (or the application on the user device) may provide such details to the animal management platform to enable the account of the animal to be registered. In some implementations, the application may encrypt such details (e.g., using a quick response (QR) code, and/or the like) prior to providing the details (e.g., which may correspond to event information, as described herein) to the animal management platform. Based on the details, the animal management platform may create an enrollment animal record that is to be stored in the distributed ledger, as described herein.

In this way, the animal management platform may generate animal records for corresponding events using the event information and/or the animal identification information to permit the animal management platform to maintain the animal records in the distributed ledger as described herein.

As further shown in FIG. 1A, and by reference number 140, the animal management platform adds the animal records to the distributed ledger. For example, the animal management platform may perform a transaction involving one or more blocks of the distributed ledger to add the animal record to the distributed ledger.

The blocks of the distributed ledger may be sorted chronologically, sorted according to location, sorted according to authorizations, and/or the like. A block may include (e.g., store, maintain, and/or the like) one or more animal records, and each of the animal records in that block may be associated with one or more animals. Accordingly, a first animal record for a first event involving the animal (e.g., registering the animal with the animal management platform) may be included in block 1-1 and a second animal record for a second event involving the animal (e.g., receiving a vaccination) may be included in block 2-2.

In some implementations, when generating and/or storing an animal record, the animal management platform may perform a hash function in association with the animal details and/or event information. For example, the animal management platform may generate a hash of the event information (e.g., using the hash function). Accordingly, the animal management platform may configure various authorization settings for a medical record.

In some implementations, the animal management platform may generate an animal record using a private key. For example the animal management platform may sign and/or certify the animal record using a private key associated with the user device. The private key may correspond to a certification associated with the user and/or the animal that is authenticated by the user device (e.g., via an application on the user device) when the user logs into the user device and/or enters the animal identification information into the user device. Accordingly, via the private key, the animal management platform may certify that the record was stored and/or created in association with the user device (and/or the user or animal). Correspondingly, one or more of the authorized entities may use a public key (e.g., a public key that is paired to the private key) to verify the private key. Accordingly, the authorized entities may verify that the record was created and/or stored by the user device. Furthermore, using the private key/public key pair the authorized entities may certify that the records are authenticated and/or certified by a trusted entity.

According to some implementations, the animal management platform may map block identification information to the identifier in a data structure (e.g., a table, an index, a mapping, a graph, and/or the like). Additionally, or alternatively, the animal management platform may provide the animal record identifier for the animal (and/or the animal record) to the user device (e.g., to permit an application of the user device to locally map the animal record identifier and/or animal record to the animal).

In this way, the animal management platform may maintain the animal records in the distributed ledger to provide secure and scalable accessibility of the animal records. Accordingly, any authorized entities that are communicatively coupled with the distributed ledger can access the animal records according to authorization settings of the animal records.

As shown in FIG. 1B, and by reference number 150, the animal management platform receives, from an authorized entity (e.g., one of the nodes), a request for information associated with an animal. The request for the information may be a request to certify a status of the animal. For example, the authorized entity may request that the animal management platform indicate whether the animal has received vaccinations, whether the animal is authorized to travel, whether the animal is a certified service dog, whether the animal is wild/domestic, whether the animal is registered with the animal management platform, whether the animal is certified organic, and/or the like.

The request may include animal identification information and/or an animal record identifier. The animal management platform may determine (e.g., using a mapping of animal identification information and animal record identifiers) whether an animal associated with the animal identification information and/or the animal record identifier is registered with the animal management platform. Additionally, or alternatively, the animal management platform may determine whether the authorized entity is authorized to access the distributed ledger (e.g., based on credentials associated with the authorized entity). If the animal management platform determines that the animal is not registered with the animal management platform and/or that the authorized entity is not authorized to access the distributed ledger, the animal management platform may reject the request for the information (e.g., by sending a notification of the rejection).

In some implementations, an authorized entity may be given an authorization to access the animal records in the distributed ledger. For example, the authorized entity may go through an application and/or certification process to be able to access the distributed ledger. In this way, only certified entities (e.g., veterinarians, sanctioned entities (e.g., research entities, certification authorities, and/or the like), governmental entities, and/or the like) may be allowed to access the distributed ledger and/or add animal records to the distributed ledger. In some implementations, the authorized entities may be authenticated and/or verified using one or more authentication processes. For example, the authorized entities may use one or more of a username/password combination to access the distributed ledger, a biometric signature (e.g., using facial recognition, a fingerprint analysis, and/or the like), a certificate (e.g., a digital certificate) of the user, and/or the like to access the distributed ledger to permit the animal management platform to determine that the authorized entity is authorized to access the distributed ledger. In some implementations, the authorized entities may correspond to and/or include one or more of the users that are capable of recording event information associated with events involving the animal.

In this way, the animal management platform may receive a request for information associated with an animal from an authorized entity to permit the animal management platform to obtain the information from the distributed ledger and/or provide the information to the authorized entity.

As further shown in FIG. 1B, and by reference number 160, the animal management platform obtains information associated with the animal from the block of the distributed ledger. For example, the animal management platform may obtain the information based on receiving the request and/or determining that the authorized entity is authorized to receive the information.

In some implementations, the animal management platform may determine whether the authorized entity is authorized to access individual animal records associated with the animal. For example, the animal management platform may maintain a mapping of identifiers of authorized entities to particular animal records (e.g., animal records associated with particular animals and/or particular users). Accordingly, from the mapping, the animal management platform may identify, in the mapping, an identifier associated with the authorized entity to verify that the authorized entity has access to blocks of the distributed ledger that are associated with the animal (e.g., according to the animal identification information and/or the animal record identifier). If the an identifier of an entity is not in the mapping, the animal management platform may determine that the entity is not authorized to access that particular animal record and may not permit access to the animal record. In such cases, the animal management platform may notify the entity that the entity is not identified as an authorized entity. Furthermore, the animal management platform may permit the authorized entity to provide a different identifier and/or credentials that may indicate that the entity is authorized to access the animal records.

In some implementations, the animal management platform may process hundreds, thousands, millions, or more records in the distributed ledger and/or may process hundreds, thousands, millions, or more requests for access to the hundreds, thousands, millions, or more records in the distributed ledger. In some implementations, based on receiving a request for information from the distributed ledger, the animal management platform may perform a filtering technique to identify animal records that include requested information associated with the animal. For example, the animal management platform may filter according to one or more characteristics of the animal records (e.g., animal record identifier, event type, event location, and/or the like). In some implementations, the animal management platform may maintain an index associated with the distributed ledger. For example, the index may sort and/or identify blocks by animal record identifier.

In some implementations, the animal management platform may use a machine learning model, such as an animal management model, to identify animal records in the distributed ledger that are associated with a same animal and establish a relationship (e.g., using a mapping, index, and/or the like) between the animal records of the distributed ledger. For example, the animal management platform may train the animal management model based on one or more parameters associated with determining relationships between animal records of the distributed ledger, such as animal record identifiers (and/or animal identification information) indicated in the blocks, one or more biometric signatures of an animal indicated in the transactions, a species associated with an animal indicated in the blocks, a location associated with an animal indicated in the blocks, health information associated with an animal indicated in the blocks, a user associated with an animal indicated in the transactions, an ownership status of an animal indicated in the blocks, and/or the like. The animal management platform may train the animal management model using historical data associated with determining relationships between animal records in the distributed ledger and/or determining that one or more animal records are associated with a same animal according to the one or more parameters or may receive an animal management model trained in that manner. Using the historical data and the one or more parameters as inputs to the animal management model, the animal management platform may determine animal records that are associated with a same animal, to permit the animal management platform to manage information associated with the animal, provide the information associated with the animal (e.g., based on a request from an authorized user), and/or perform an action associated with the information that is associated with the animal (e.g., send a notification associated with the information, send an alert regarding the status of the animal, and/or the like).

As a specific example, assume that the authorized entity is a veterinarian that is providing a medical treatment to an animal named Spot. The animal management platform, in the request from the authorized entity, may receive animal identification information (Animal ID) "XYZ" and/or an animal record identifier (ARI) "987654" from the veterinarian. The animal management platform may verify that the veterinarian is permitted to access the distributed ledger and/or animal records associated with Spot (e.g., using a mapping of credentials for the veterinarian to the animal record identifier for Spot). If the animal management platform determines that the veterinarian is authorized to access information associated with Spot (e.g., using a mapping of the animal records to authorized entities), the animal management platform may access the animal records (including Animal Record 1 of block 1-2) in the distributed ledger associated with Spot.

In this way, the animal management platform may obtain the information for the authorized entity to permit the animal management platform to provide the information to the authorized entity.

As further shown in FIG. 1B, and by reference number 170, the animal management platform provides the information to the authorized entity. For example, the animal management platform may provide the information to indicate a status of the animal. Such a status may be a particular health status, a particular travel status, a particular service certification status, a raised organic status, wild/domestic status, and/or the like.

In some implementations, the animal management platform may send an attestation in connection with information from an animal record in the distributed ledger. For example, a user may instruct the animal management platform to provide the attestation to an authorized entity in association with generating the animal record and/or adding the animal record to the distributed ledger. The attestation may serve as a notification that may be verified as true by the authorized entity. For example, a veterinarian may send an attestation to an owner of the animal to indicate that the animal is a certified service animal, received health treatments (e.g., vaccinations, medications, and/or the like), is clear to travel, and/or the like. In some implementations, based on the animal record identifier, an attestation for a certification of health of an animal may be located on the distributed ledger. The distributed ledger may store verified animal records for animal health and other data, and the attestation may be persisted on the distributed ledger as one of the verified animal records. The attestation for a certification may be processed to determine the producer of the attestation (e.g., if a governmental entity that regulates transportation of animals wants to verify that a certified veterinarian cleared the animal for travel). Accordingly, one or more authorized entities may use an attestation to verify the authenticity of an animal record in the distributed ledger.

In some implementations, the distributed ledger may be made publicly available and accessible to anybody from anywhere in the world. Additionally, or alternatively, the distributed ledger may be made privately available and accessible to only authorized entities from anywhere in the world. On the other hand, in some implementations, the distributed ledger may only be accessible to authorized entities from designated locations and/or areas, from designated devices, via designated entities or industries, and/or the like. As mentioned above, while most information associated with animals may not be subject to privacy laws, some information, such as ownership information, may be subject to privacy laws. Accordingly, in such cases, ownership information can be redacted from view within the distributed ledger to certain authorized entities (e.g., users that are not entitled to know who is the owner of the animal) that access the blocks (and animal records therein) of the distributed ledger.

Additionally, or alternatively, only information stored in the animal record that does not violate any privacy laws and/or that is requested to be excluded from the animal record (e.g., by an owner of the animal, entity associated with the animal, and/or the like) is to be included within the animal record (e.g., so as to abide by the privacy laws, request wishes of the user, and/or the like). Furthermore, in some implementations, one or more pieces of information in the animal records may be hashed using a hash function, such that the one or more pieces of information in the transaction cannot be detected without performing a corresponding hash function on the one or more pieces of information. In such cases, the one or more pieces of information may be stored off the distributed ledger and can be verified using the hash function. Accordingly, the animal management platform may use the hash function to ensure that the one or more pieces of information have not been corrupted, modified, and/or tampered with in any unauthorized manner.

In some implementations, the animal management platform may be configured to perform one or more actions associated with the information in the animal records of the distributed ledger system. For example, the animal management platform may send an alert to a user associated with an animal, an entity associated with the animal record, and/or the like based on information in the one or more animal records. More specifically, the animal management platform may notify one or more of the users and/or authorized entities that an animal may be ill (or predict a health risk), may be located in a particular region (e.g., if migrating), may be certified according to one or more standards (e.g., certified organic), and/or the like.

In some implementations, the animal management platform may use a machine learning model to perform one or more actions associated with information of an animal, as described herein. For example, the animal management platform may train the machine learning model based on one or more parameters associated with determining a status of the animal, such as identifying the species of the animal, health status of the animal, location of the animal, ownership of the animal, uses of the animal, and/or the like. The animal management platform may train the machine learning model using historical data associated with performing an action based on the status of the animal according to the one or more parameters. Using the historical data and the one or more parameters as inputs to the machine learning model, the animal management platform may perform the action associated with the animal to prevent any future harm to the animal, permit the animal to be transported to a particular location, predict behavior of the animal (e.g., according to migration patterns, breeding patterns, and/or the like), treat any existing illness that the animal may have, and/or the like.

In this way, the animal management platform may provide the information and/or perform a corresponding action associated with the animal based on the animal record and/or a request for the animal record.

As indicated above, FIGS. 1A and 1B are provided merely as one or more examples. Other examples may differ from what is described with regard to FIGS. 1A and 1B.

Figure 2:
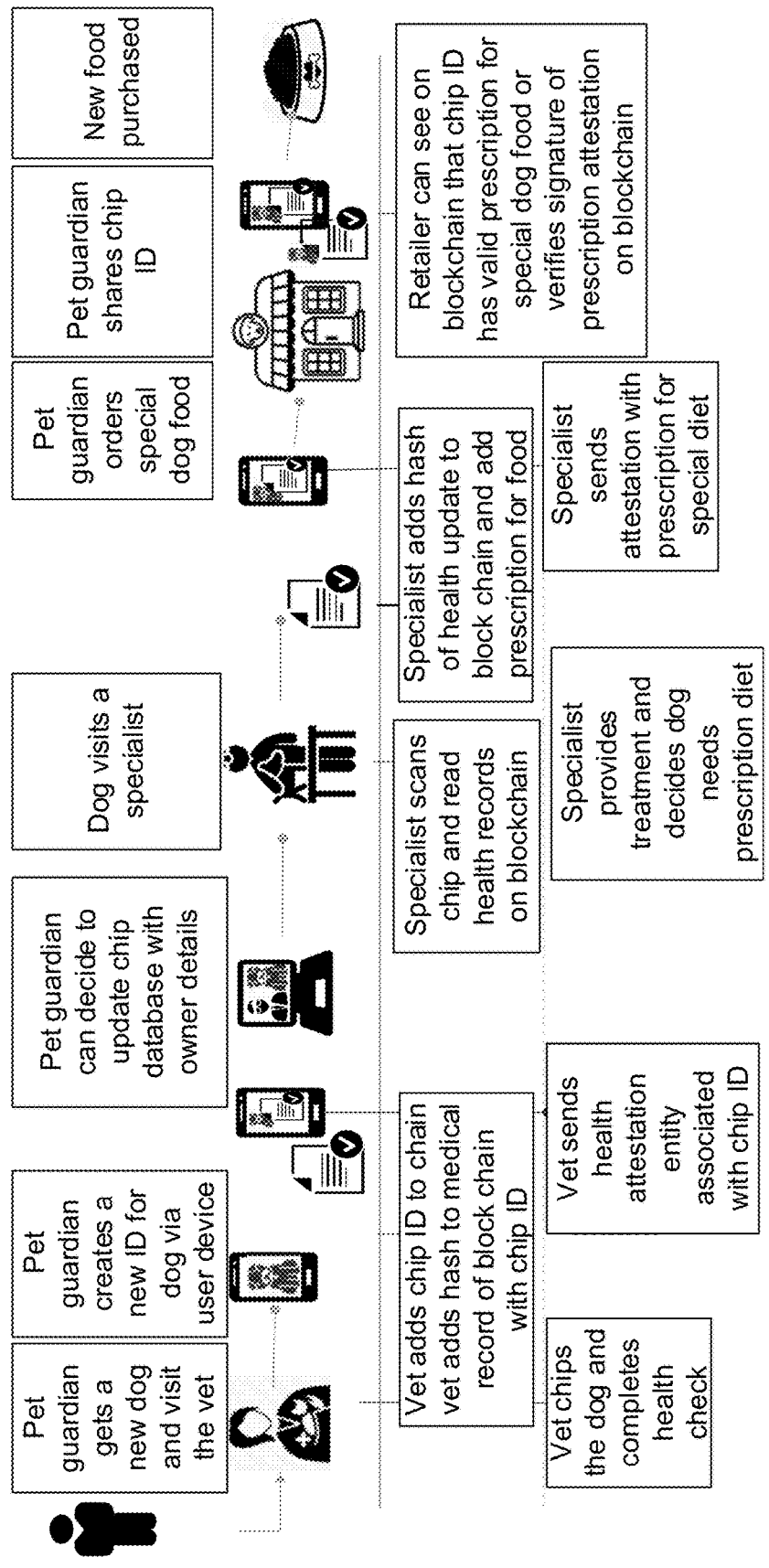

FIG. 2 is a diagram of an example implementation 200 described herein. Example implementation 200 includes an example of a pet guardian (e.g., owner) getting a new dog, visiting the veterinarian, visiting a dietary specialist (shown as a "specialist"), and visiting a retailer to purchase food for the new dog. Example implementation 200 utilizes a blockchain managed by an animal management platform, as described herein. The pet guardian, the veterinarian, the dietary specialist, and/or the retailer may correspond to one or more of the users and/or authorized entities of example implementation 100.

As shown in FIG. 2, the pet guardian gets a new dog and visits the veterinarian. The veterinarian chips the dog and performs a health check. The pet guardian may create a new account (e.g., register or enroll the dog) with the animal management platform via a user device. The veterinarian may then add the microchip number (chip ID) and/or a hash of medical information associated with the visit to the blockchain using the chip ID (e.g., as animal identification information). Furthermore, the veterinarian may send a health attestation to an entity associated with the microchip (e.g., an owner of the microchip, an entity that monitors distribution of microchips, an entity that monitors animals via microchips, and/or the like). As shown, the pet guardian may update a microchip database with owner details.

As further shown in FIG. 2, the dog may visit a dietary specialist. The dietary specialist may scan the microchip and read, from the blockchain, the health records recorded by the veterinarian. The dietary specialist may provide corresponding treatment to the dog and determine that the dog needs a prescription diet. The dietary specialist may add a hash of the health update to the blockchain and add a prescription for food. Further, the dietary specialist may send an attestation with the prescription to the pet guardian.

As further shown in FIG. 2, the pet guardian (e.g., based on receiving the attestation with the prescription) may order special dog food from a retailer. The pet guardian may provide the prescription attestation and/or the chip ID to the retailer. The retailer can see, on the blockchain, that the dog (via the chip ID) has a valid prescription for the special dog food and/or verify a signature of the prescription attestation on the blockchain.

In this way, multiple entities may utilize and/or access animal records associated with a dog to permit a pet guardian, a veterinarian, and/or a dietary specialist to care for the animal.

As indicated above, FIG. 2 is provided merely as an example. Other examples may differ from what is described with regard to FIG. 2.

Figure 3:
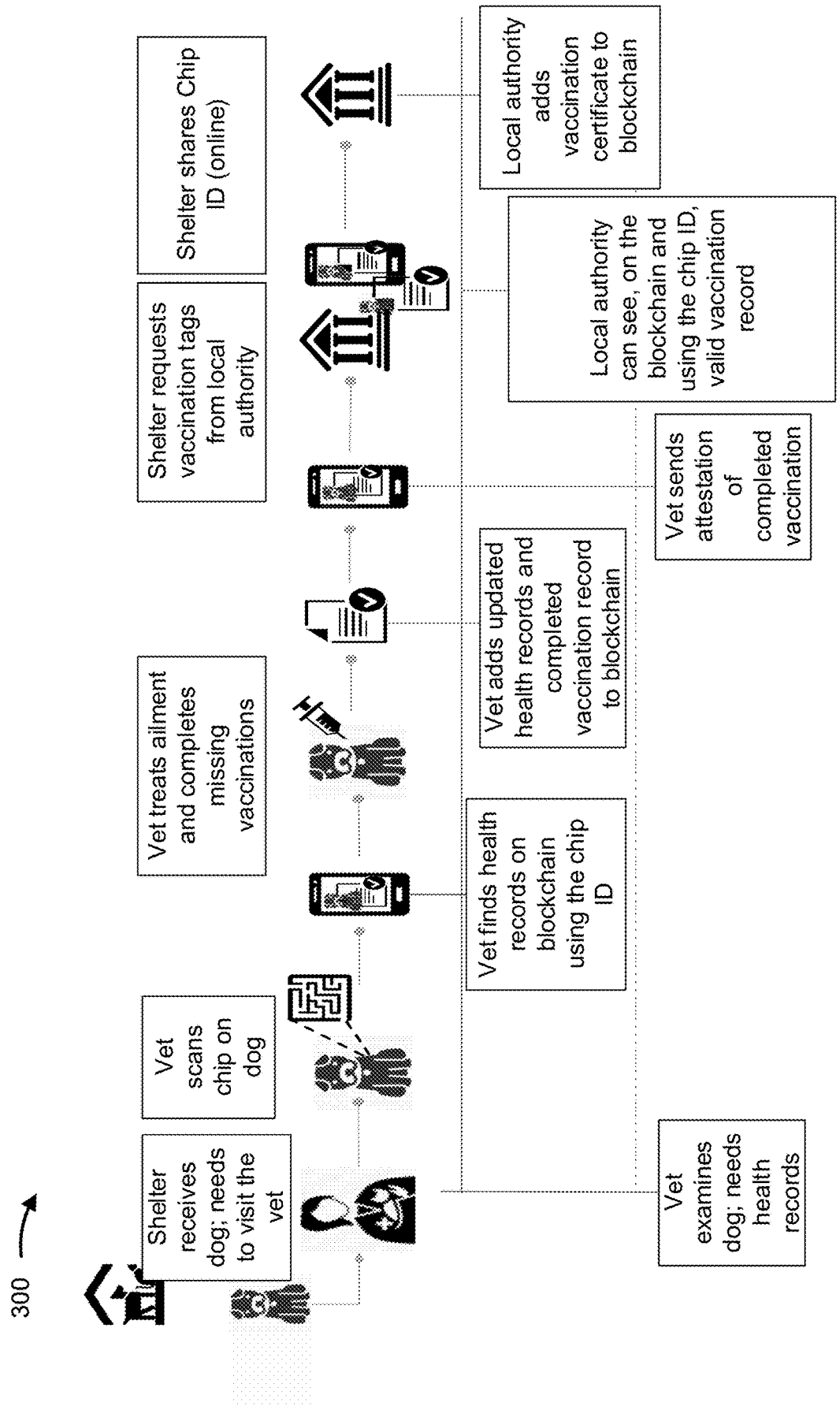

FIG. 3 is a diagram of an example implementation 300 described herein. Example implementation 300 includes an example of a shelter receiving a new dog, the dog visiting a veterinarian, the dog receiving treatment from the veterinarian, and a local authority that certifies vaccinations received by the dog. Example implementation 300 utilizes a blockchain managed by an animal management platform, as described herein. The shelter, the veterinarian, and the local authority may correspond to one or more of the users and/or authorized entities of example implementation 100.

As shown in FIG. 3, the shelter receives a new dog and the dog needs to visit the veterinarian. The veterinarian examines the dog and determines that health records are needed. The veterinarian may scan the chip on the dog. The veterinarian may find health records for the dog on the blockchain using the chip ID. The veterinarian can treat ailments and complete missing vaccinations. The veterinarian can add the updated health record and completed vaccination record to the blockchain. The veterinarian may also send an attestation of completed vaccinations to the local authority and/or may request the vaccination tags from the local authority by providing the chip ID. The local authority may see, on the blockchain and using the chip ID, a valid vaccination record. The local authority may then add a vaccination certificate to the blockchain for the dog.

In this way, a dog can be rescued at a shelter, treated for ailments, vaccinated, and certified using the animal management platform, as described herein.

As indicated above, FIG. 3 is provided merely as an example. Other examples may differ from what is described with regard to FIG. 3.

Figure 4:
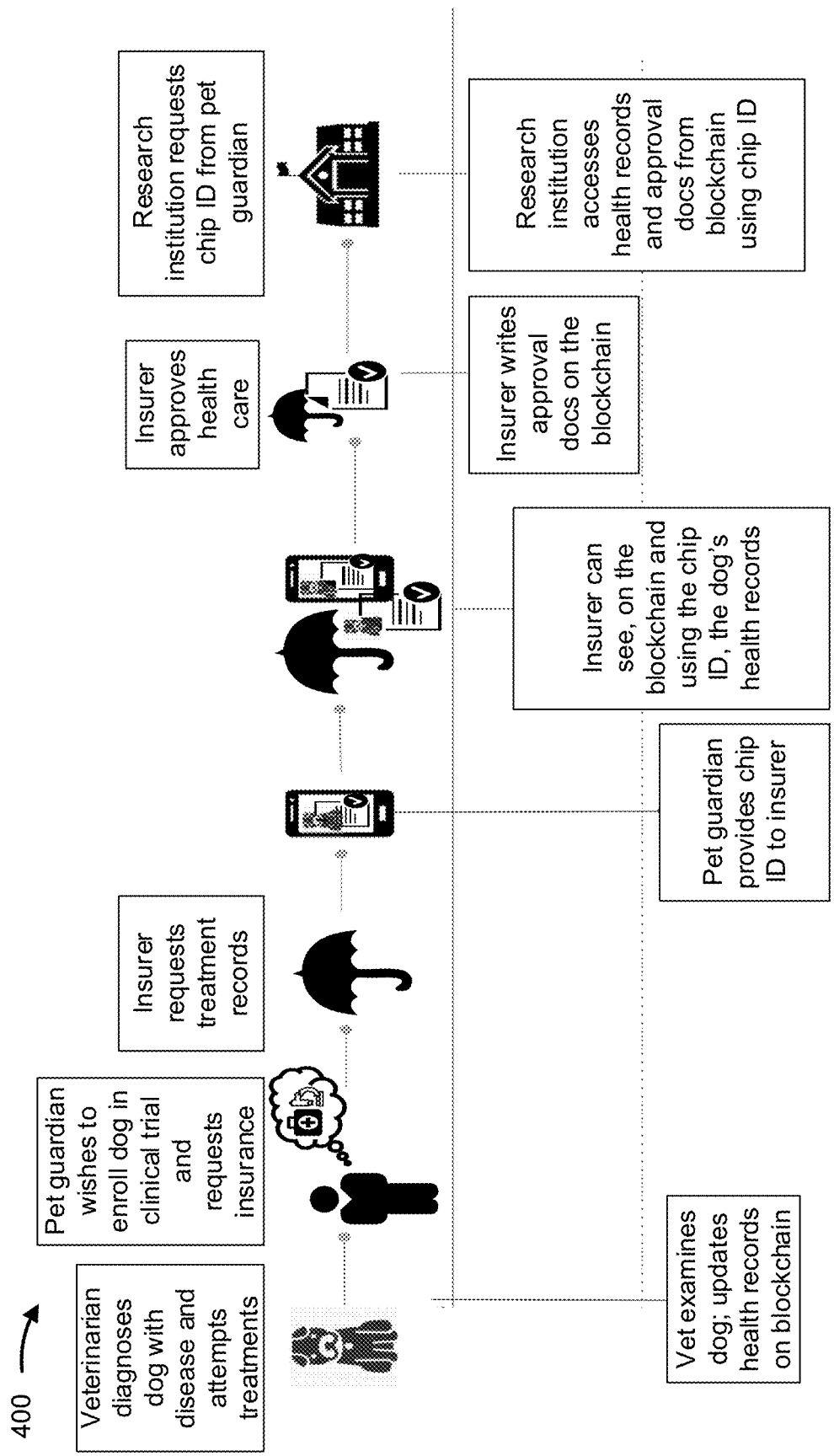

FIG. 4 is a diagram of an example implementation 400 described herein. Example implementation 400 includes an example of a dog being diagnosed with a disease by a veterinarian, a pet guardian enrolling the dog in a clinical trial, an insurance provider providing health care, and research institution that performs the clinical trial. Example implementation 400 utilizes a blockchain managed by an animal management platform, as described herein. The veterinarian, the pet guardian, the insurance provider, and the research institution may correspond to one or more of the users and/or authorized entities of example implementation 100.

As shown in FIG. 4, the veterinarian diagnoses the dog with the disease and attempts to provide treatment. The veterinarian may examine the dog and update health records on the blockchain. The pet guardian may wish to enroll the dog in a clinical trial and requests insurance. The insurance provider ("insurer") requests treatment records. The pet guardian may provide a chip ID for the dog to the insurance provider. The insurance provider may see, on the blockchain, that the dog has health records. The insurance provider may approve healthcare according to the health records and write approval documents to the blockchain. The research institution, when performing the clinical trial, requests the chip ID to access health records and approval documents. The pet guardian may provide the chip ID for the dog to the research institution so that the research institution can access the health records and approval documents from the blockchain.

As indicated above, FIG. 4 is provided merely as an example. Other examples may differ from what is described with regard to FIG. 4.

In this way, some implementations described herein provide a distributed database that may use one or more mechanisms to identify animals, manage animal records associated with the animals, and/or determine a status of the animals. Furthermore, one or more consensus mechanisms may be used to verify the one or more transactions of the blockchain according to the participating members and/or authorized members associated with the blockchain.

Figure 5:
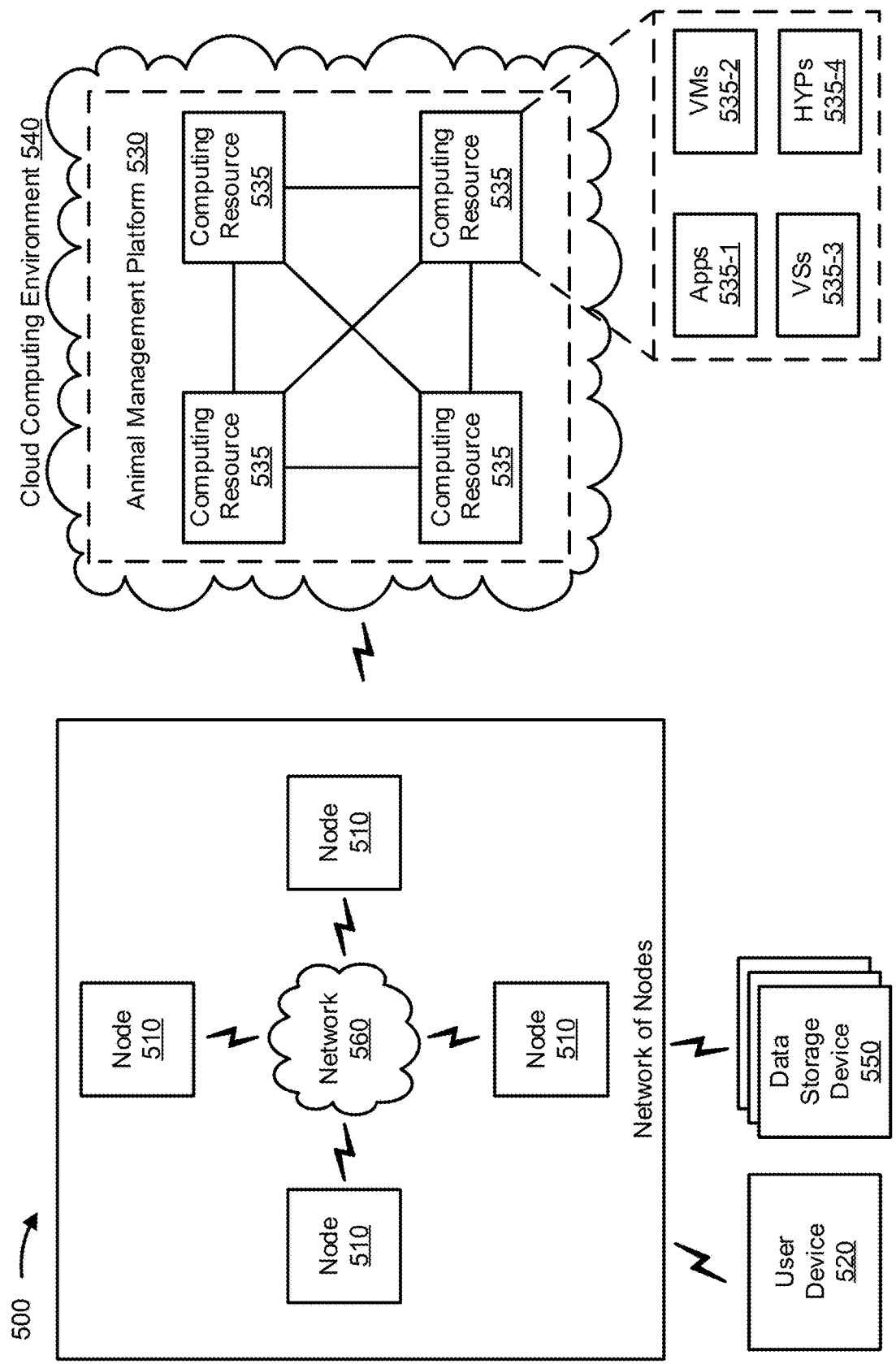
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include one or more nodes 510 (referred to individually as a "node 510" and collectively as "nodes 510"), a user device 520, an animal management platform 530, a computing resource 535, a cloud computing environment 540, one or more data storage devices 550 (referred to individually as "data storage device 550" and collectively as "data storage devices 550"), and a network 560. Devices of environment 500 may interconnect via wired connections, wireless connections, or a combination of wired and wireless connections.

Node 510 includes one or more devices capable of receiving, generating, storing, processing, and/or providing information associated with an animal. For example, node 510 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a group of nodes 510 may be part of a network that is able to utilize a distributed ledger system and/or animal management platform 530 to access animal records as described herein. In some implementations, node 510 may be a device associated with an entity, such as an organization, a subsidiary of the organization, an individual, and/or the like. In some implementations, nodes 510 may be associated with multiple organizations, multiple subsidiaries of an organization, multiple individuals, and/or the like.

User device 520 includes one or more devices capable of receiving, generating, storing, processing, and/or providing information associated with an animal. For example, user device 520 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an IoT device, or a similar type of device.

Animal management platform 530 includes one or more computing resources assigned to receive, generate, store, process, and/or provide information associated with an animal. For example, animal management platform 530 may be a platform implemented by cloud computing environment 540 that may manage one or more animal records using a distributed ledger (e.g., stored and/or maintained in data storage device 550 of a distributed ledger system), as described herein. In some implementations, animal management platform 530 is implemented by computing resources 535 of cloud computing environment 540. Animal management platform 530 may include one or more server devices, (e.g., one or more host servers, web servers, application servers, etc.), one or more data center devices, or one or more other similar devices.

In some implementations, animal management platform 530 may perform one or more actions described as being performed by node 510. In some implementations, animal management platform 530 may serve as a master node or a management node for nodes 510. In some implementations, animal management platform may be separate from nodes 510 but may interact with one or more nodes 510.

In some implementations, animal management platform 530 may be hosted in cloud computing environment 540. Notably, while implementations described herein describe animal management platform 530 as being hosted in cloud computing environment 540, in some implementations, animal management platform 530 may be non-cloud-based or may be partially cloud-based. Animal management platform 530 may correspond to the animal management platform of example implementation 100.

Cloud computing environment 540 includes an environment that hosts animal management platform 530. Cloud computing environment 540 may provide computation, software, data access, storage, and/or other services that do not require end-user knowledge of a physical location and configuration of a system and/or a device that delivers the services. As shown, cloud computing environment 540 may include animal management platform 530 and computing resource 535.

Computing resource 535 includes one or more personal computers, workstation computers, server devices, or another type of computation and/or communication device. In some implementations, computing resource 535 may host animal management platform 530. The cloud resources may include compute instances executing in computing resource 535, storage devices provided in computing resource 535, data transfer devices provided by computing resource 535, etc. In some implementations, computing resource 535 may communicate with other computing resources 535 via wired connections, wireless connections, or a combination of wired and wireless connections.

As further shown in FIG. 5, computing resource 535 may include a group of cloud resources, such as one or more applications ("APPs") 535-1, one or more virtual machines ("VMs") 535-2, virtualized storage ("VSs") 535-3, one or more hypervisors ("HYPs") 535-4, or the like.

Application 535-1 includes one or more software applications that may be provided to or accessed by user device 520. Application 535-1 may eliminate a need to install and execute the software applications on user device 520. For example, application 535-1 may include software associated with animal management platform 530 and/or any other software capable of being provided via cloud computing environment 540. In some implementations, one application 535-1 may send/receive information to/from one or more other applications 535-1, via virtual machine 535-2.

Virtual machine 535-2 includes a software implementation of a machine (e.g., a computer) that executes programs like a physical machine. Virtual machine 535-2 may be either a system virtual machine or a process virtual machine, depending upon use and degree of correspondence to any real machine by virtual machine 535-2. A system virtual machine may provide a complete system platform that supports execution of a complete operating system ("OS"). A process virtual machine may execute a single program and may support a single process. In some implementations, virtual machine 535-2 may execute on behalf of a user (e.g., user device 520), and may manage infrastructure of cloud computing environment 540, such as data management, synchronization, or long-duration data transfers.

Virtualized storage 535-3 includes one or more storage systems and/or one or more devices that use virtualization techniques within the storage systems or devices of computing resource 535. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 535-4 provides hardware virtualization techniques that allow multiple operating systems (e.g., "guest operating systems") to execute concurrently on a host computer, such as computing resource 535. Hypervisor 535-4 may present a virtual operating platform to the guest operating systems and may manage the execution of the guest operating systems. Multiple instances of a variety of operating systems may share virtualized hardware resources.

Distributed data storage device 550 may include one or more devices capable of receiving, generating, storing, processing, and/or providing information associated with an animal. For example, distributed data storage device 550 may include a computing device, such as a server, a desktop computer, a laptop computer, a tablet computer, a handheld computer, or a similar device. In some implementations, distributed data storage devices 550 may support a distributed ledger system that uses a data structure (e.g., a blockchain) to store animal records associated with animals managed by animal management platform 530.

Network 560 includes one or more wired and/or wireless networks. For example, network 560 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
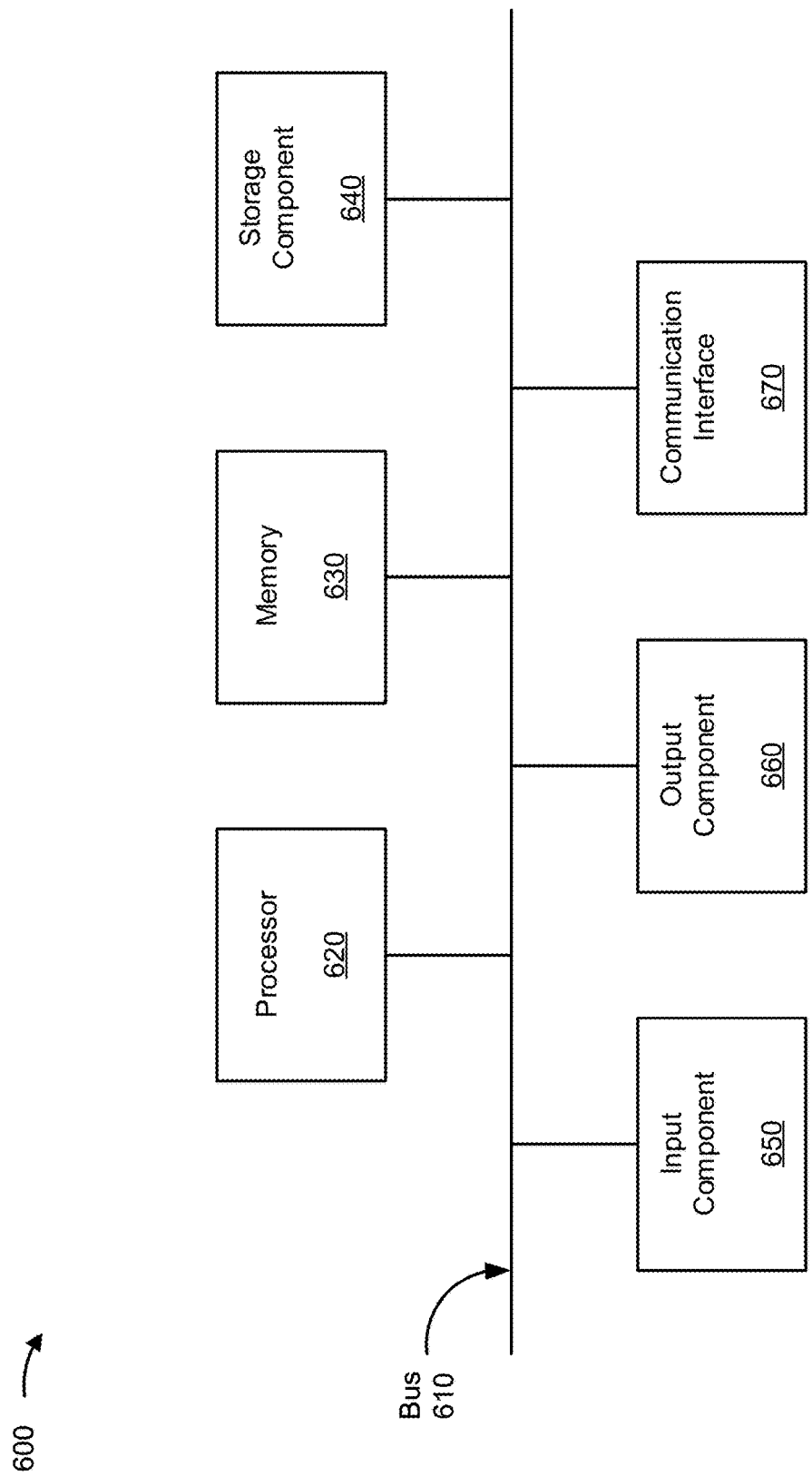
FIG. 6 is a diagram of example components of one or more devices of FIG. 5.

FIG. 6 is a diagram of example components of a device 600. Device 600 may correspond to node 510, user device 520, animal management platform 530, computing resource 535, and/or data storage device 550. In some implementations, node 510, user device 520, animal management platform 530, computing resource 535, and/or data storage device 550 may include one or more devices 600 and/or one or more components of device 600. As shown in FIG. 6, device 600 may include a bus 610, a processor 620, a memory 630, a storage component 640, an input component 650, an output component 660, and/or a communication interface 670.

Bus 610 includes a component that permits communication among multiple components of device 600. Processor 620 is implemented in hardware, firmware, and/or a combination of hardware and software. Processor 620 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
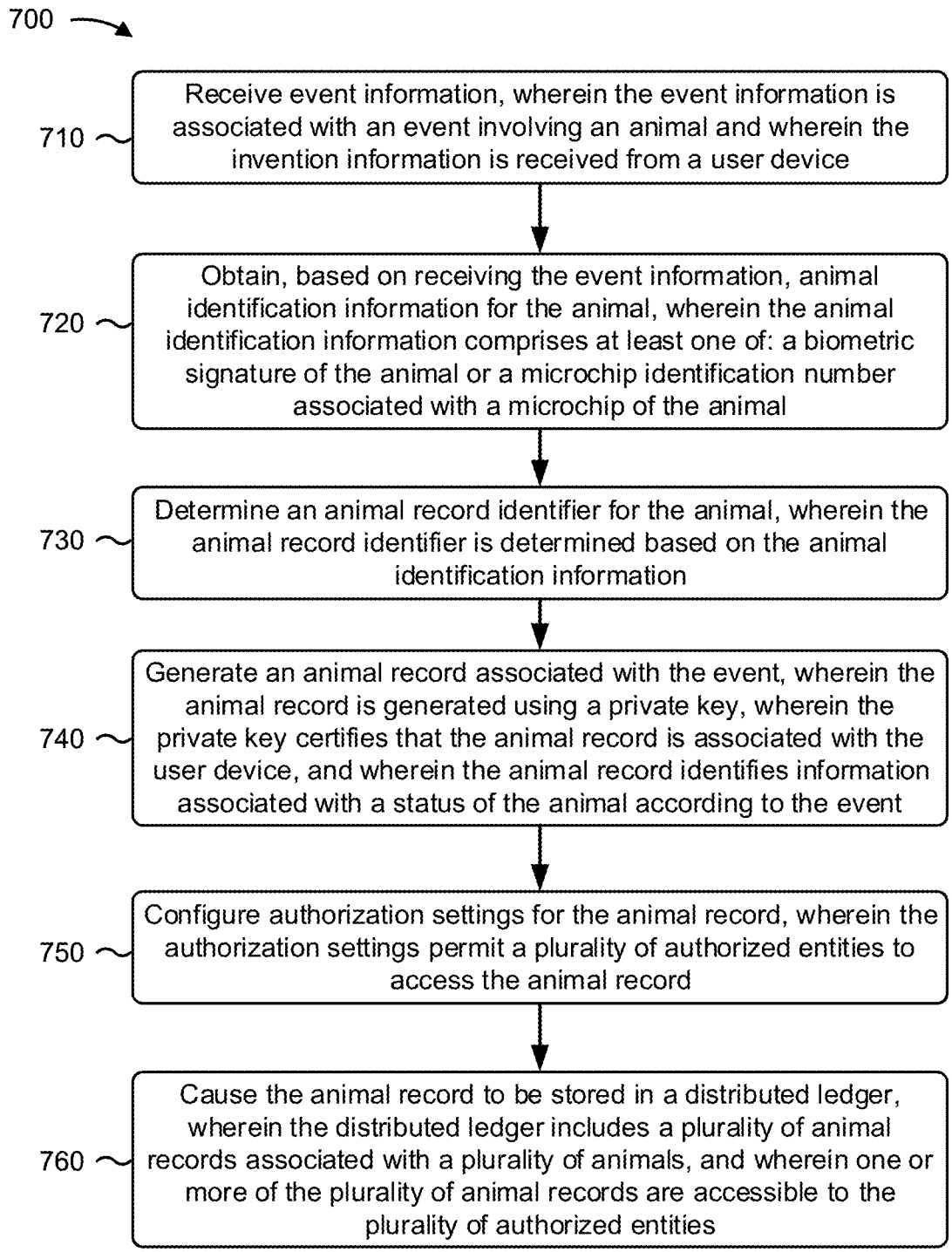
FIGS. 7-9 are flowcharts of one or more example processes associated with a distributed system for animal identification and management.

FIG. 7 is a flowchart of an example process 700 associated with a distributed system for animal identification and management. In some implementations, one or more process blocks of FIG. 7 may be performed by an animal management platform (e.g., animal management platform 530). In some implementations, one or more process blocks of FIG. 7 may be performed by another device or a group of devices separate from or including the animal management platform, such as a node (e.g., node 510), a user device (e.g., user device 520), and/or the like.

As shown in FIG. 7, process 700 may include receiving, from a user device, event information, wherein the event information is associated with an event involving an animal and wherein the event information is received from a user device (block 710). For example, the animal management platform (e.g., using computing resource 535, processor 620, memory 630, storage component 640, input component 650, output component 660, communication interface 670 and/or the like) may receive event information associated with an event involving an animal, as described above. In some implementations, the information is associated with an event involving an animal. In some implementations, the event information is received from a user device.

As further shown in FIG. 7, process 700 may include obtaining, based on receiving the event information, animal identification information for the animal, wherein the animal identification information comprises at least one of a biometric signature of the animal or a microchip identification number associated with a microchip of the animal (block 720). For example, the animal management platform (e.g., using computing resource 535, processor 620, memory 630, storage component 640, input component 650, output component 660, communication interface 670 and/or the like) may obtain, based on receiving the event information, animal identification information for the animal, as described above. In some implementations, the animal identification information comprises at least one of a biometric signature of the animal or a microchip identification number associated with a microchip of the animal.

As further shown in FIG. 7, process 700 may include determining, based on the animal identification information, an animal record identifier for the animal (block 730). For example, the animal management platform (e.g., using computing resource 535, processor 620, memory 630, storage component 640, input component 650, output component 660, communication interface 670 and/or the like) may determine, based on the animal identification information, an animal record identifier for the animal, as described above.

As further shown in FIG. 7, process 700 may include generating an animal record associated with the event, wherein the animal record is generated using a private key, wherein the private key certifies that the animal record is associated with the user device, and the animal record identifier and wherein the animal record identifies a status of the animal according to the event (block 740). For example, the animal management platform (e.g., using computing resource 535, processor 620, memory 630, storage component 640, input component 650, output component 660, communication interface 670 and/or the like) may generate an animal record associated with the event, as described above. In some implementations, the animal record is generated using a private key. In some implementations, the private key certifies that the animal record is associated with the user device. In some implementations, the animal record identifies a status of the animal according to the event.

As further shown in FIG. 7, process 700 may include configuring authorization settings for the animal record, wherein the authorization settings permit a plurality of authorized entities to access the animal record (block 750). For example, the animal management platform (e.g., using computing resource 535, processor 620, memory 630, storage component 640, input component 650, output component 660, communication interface 670 and/or the like) may configure authorization settings, for the animal record, as described above. In some implementations, the authorization settings permit a plurality of authorized entities to access the animal record.

As further shown in FIG. 7, process 700 may include causing, by the device, the animal record to be stored in a distributed ledger system, wherein the distributed ledger system includes a plurality of animal records associated with a plurality of animals, and wherein one or more of the plurality of animal records are accessible to the plurality of authorized entities (block 760). For example, the animal management platform (e.g., using computing resource 535, processor 620, memory 630, storage component 640, input component 650, output component 660, communication interface 670 and/or the like) may cause the animal record to be stored in a distributed ledger system, as described above. In some implementations, the distributed ledger system includes a plurality of animal records associated with a plurality of animals. In some implementations, one or more of the plurality of animal records are accessible to the plurality of authorized entities.

Process 700 may include additional implementations, such as any single implementation or any combination of implementations described below and/or in connection with one or more other processes described elsewhere herein.

In a first implementation, the animal management platform may generate an attestation based on the animal record to verify a certification of the animal corresponding to the event. In a second implementation, alone or in combination with the first implementation, the distributed ledger system includes a blockchain and the animal record is stored in a block of the blockchain. In a third implementation, alone or in combination with any one or more of the first and second implementations, the authorization settings are configured based on at least one of a characteristic of the event or a characteristic of the animal.

In a fourth implementation, alone or in combination with any one or more of the first through third implementations, the event is associated with receiving medical treatment, the user device is associated with a veterinary entity that provided the medical treatment, and the status corresponds to a medical status of the animal.

In a fifth implementation, alone or in combination with any one or more of the first through fourth implementations, the event is associated with transporting the animal, the user device is associated with a transportation entity associated with enabling transportation involving the animal, and the status identifies a location of the animal.

In a sixth implementation, alone or in combination with any one or more of the first through fifth implementations, the event is associated with creating an account for the animal, the account is identified by the animal record identifier, the animal record is to include the animal record identifier, and the status is based on the event information provided in association with creating the account.

In a seventh implementation, alone or in combination with any one or more of the first through sixth implementations, the plurality of authorized entities include two or more of a current owner associated with the animal, a prospective owner associated with the animal, a service provider associated with providing a service for the animal, an insurance provider associated with authorizing veterinary care for the animal, an entity associated with enabling transportation involving the animal, or a real estate entity associated with a dwelling of the current owner of the animal.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
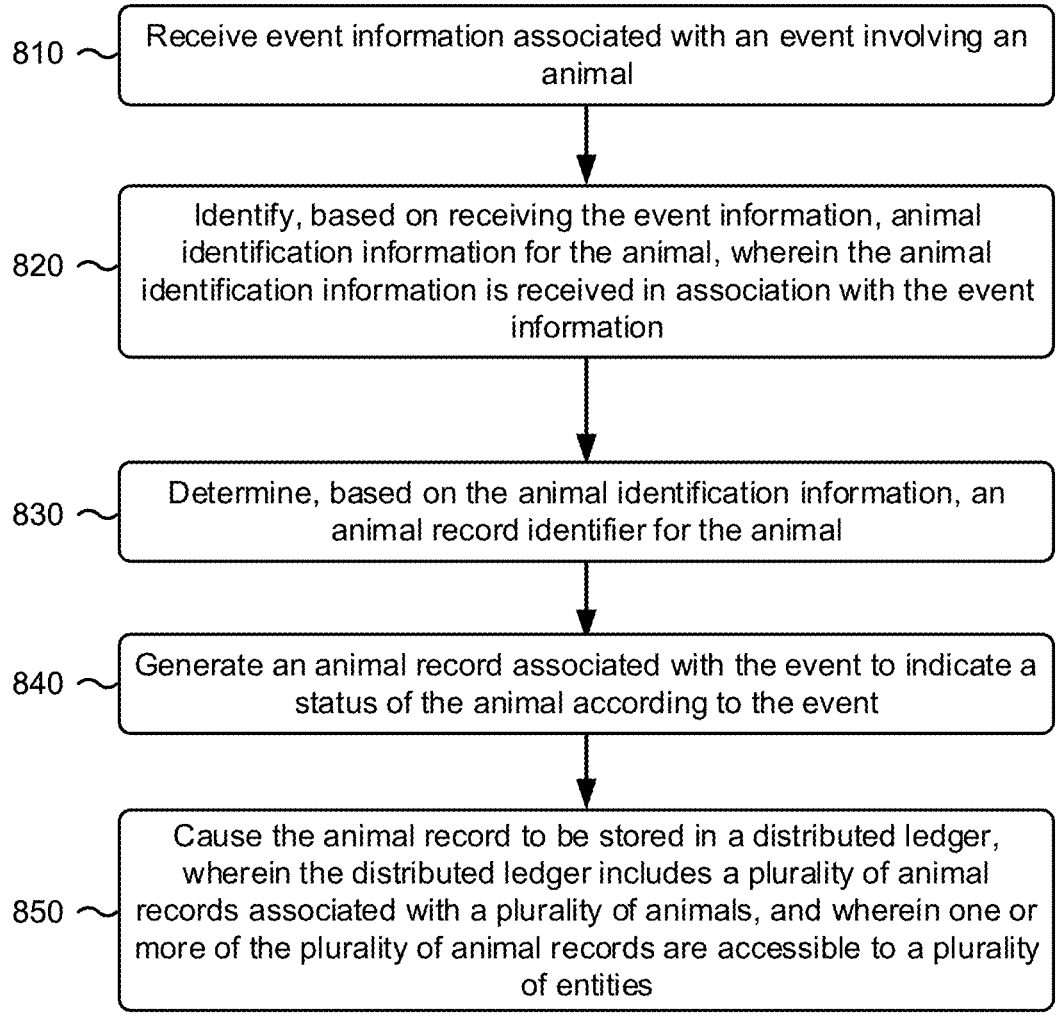

FIG. 8 is a flowchart of an example process 800 for a distributed system for animal identification and management. In some implementations, one or more process blocks of FIG. 8 may be performed by an animal management platform (e.g., animal management platform 530). In some implementations, one or more process blocks of FIG. 8 may be performed by another device or a group of devices separate from or including the animal management platform, such as a node (e.g., node 510), a user device (e.g., user device 520), and/or the like.

As shown in FIG. 8, process 800 may include receiving event information associated with an event involving an animal (block 810). For example, the animal management platform (e.g., using computing resource 535, processor 620, memory 630, storage component 640, input component 650, output component 660, communication interface 670 and/or the like) may receive event information associated with an event involving an animal, as described above.

As further shown in FIG. 8, process 800 may include identifying, based on receiving the event information, animal identification information for the animal, wherein the animal identification information is received in association with the event information (block 820). For example, the animal management platform (e.g., using computing resource 535, processor 620, memory 630, storage component 640, input component 650, output component 660, communication interface 670 and/or the like) may identify, based on receiving the event information, animal identification information for the animal, as described above. In some implementations, the animal identification information is received in association with the event information.

As further shown in FIG. 8, process 800 may include determining, based on the animal identification information, an animal record identifier for the animal (block 830). For example, the animal management platform (e.g., using computing resource 535, processor 620, memory 630, storage component 640, input component 650, output component 660, communication interface 670 and/or the like) may determine, based on the animal identification information, an animal record identifier for the animal, as described above.

As further shown in FIG. 8, process 800 may include generating an animal record associated with the event to indicate a status of the animal according to the event (block 840). For example, the animal management platform (e.g., using computing resource 535, processor 620, memory 630, storage component 640, input component 650, output component 660, communication interface 670 and/or the like) may generate an animal record associated with the event to indicate a status of the animal according to the event, as described above.

As further shown in FIG. 8, process 800 may include causing the animal record to be stored in a distributed ledger system, wherein the distributed ledger system includes a plurality of animal records associated with a plurality of animals, and wherein one or more of the plurality of animal records are accessible to a plurality of entities (block 850). For example, the animal management platform (e.g., using computing resource 535, processor 620, memory 630, storage component 640, input component 650, output component 660, communication interface 670 and/or the like) may cause the animal record to be stored in a distributed ledger system, as described above. In some implementations, the distributed ledger system includes a plurality of animal records associated with a plurality of animals. In some implementations, one or more of the plurality of animal records are accessible to a plurality of entities.

Process 800 may include additional implementations, such as any single implementation or any combination of implementations described below and/or in connection with one or more other processes described elsewhere herein.

In a first implementation, the animal record identifier is determined using a mapping of the animal identification information to the animal record identifier. In a second implementation, alone or in combination with the first implementation, the animal identification information comprises a biometric signature of the animal. In a third implementation, alone or in combination with any one or more of the first and second implementations, the biometric signature of the animal is based on an image of the animal.

In a fourth implementation, alone or in combination with any one or more of the first through third implementations, the animal identification information comprises a microchip identification number that is embedded within the animal. In a fifth implementation, alone or in combination with any one or more of the first through fourth implementations, the plurality of entities are authorized to access the one or more of the plurality of animal records according to authorization settings of the one or more of the plurality of animal records.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
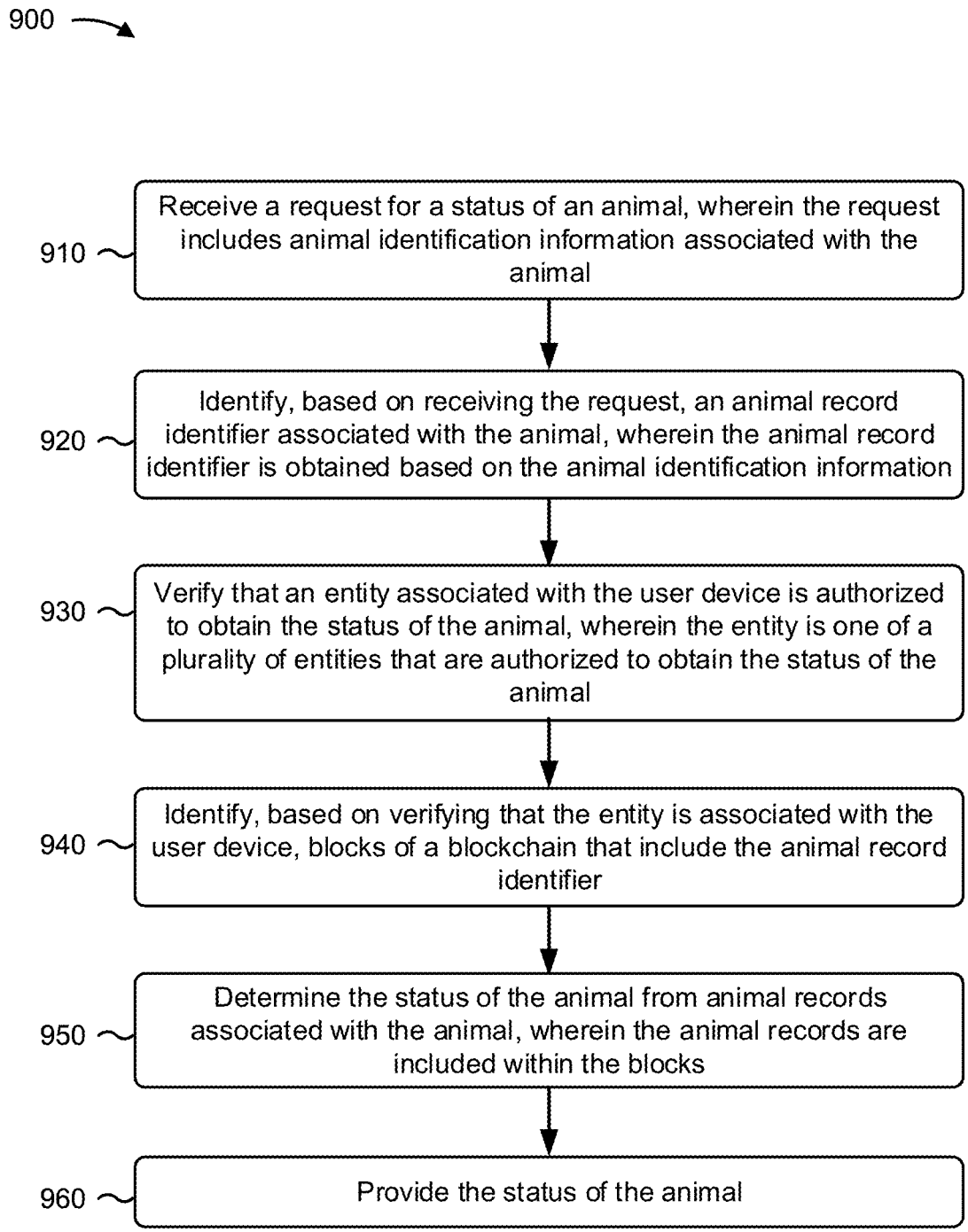

FIG. 9 is a flowchart of an example process 900 for distributed system for animal identification and management. In some implementations, one or more process blocks of FIG. 9 may be performed by an animal management platform (e.g., animal management platform 530). In some implementations, one or more process blocks of FIG. 9 may be performed by another device or a group of devices separate from or including the animal management platform, such as a node (e.g., node 510), a user device (e.g., user device 520), and/or the like.

As shown in FIG. 9, process 900 may include receiving, from a user device, a request for a status of an animal, wherein the request includes animal identification information associated with the animal (block 910). For example, the animal management platform (e.g., using computing resource 535, processor 620, memory 630, storage component 640, input component 650, output component 660, communication interface 670 and/or the like) may receive, from a user device, a request for a status of an animal, as described above. In some implementations, the request includes animal identification information associated with the animal.

As further shown in FIG. 9, process 900 may include identifying, based on receiving the request, an animal record identifier associated with the animal, wherein the animal record identifier is obtained based on the animal identification information (block 920). For example, the animal management platform (e.g., using computing resource 535, processor 620, memory 630, storage component 640, input component 650, output component 660, communication interface 670 and/or the like) may identify, based on receiving the request, an animal record identifier associated with the animal, as described above. In some implementations, the animal record identifier is obtained based on the animal identification information.

As further shown in FIG. 9, process 900 may include verifying that an entity associated with the user device is authorized to obtain the status of the animal, wherein the entity is one of a plurality of entities that are authorized to obtain the status of the animal (block 930). For example, the animal management platform (e.g., using computing resource 535, processor 620, memory 630, storage component 640, input component 650, output component 660, communication interface 670 and/or the like) may verify that an entity associated with the user device is authorized to obtain the status of the animal, as described above. In some implementations, the entity is one of a plurality of entities that are authorized to obtain the status of the animal.

As further shown in FIG. 9, process 900 may include identifying, based on verifying that the entity is associated with the user device, blocks of a blockchain that include the animal record identifier (block 940). For example, the animal management platform (e.g., using computing resource 535, processor 620, memory 630, storage component 640, input component 650, output component 660, communication interface 670 and/or the like) may identify, based on verifying that the entity is associated with the user device, blocks of a blockchain that include the animal record identifier, as described above.

As further shown in FIG. 9, process 900 may include determining the status of the animal from animal records associated with the animal wherein the animal records are included within the blocks (block 950). For example, the animal management platform (e.g., using computing resource 535, processor 620, memory 630, storage component 640, input component 650, output component 660, communication interface 670 and/or the like) may determine the status of the animal from animal records associated with the animal, as described above. In some implementations, the animal records are included within the blocks.

As further shown in FIG. 9, process 900 may include providing, to the user device, the status of the animal (block 960). For example, the animal management platform (e.g., using computing resource 535, processor 620, memory 630, storage component 640, input component 650, output component 660, communication interface 670 and/or the like) may provide, to the user device, the status of the animal, as described above.

Process 900 may include additional implementations, such as any single implementation or any combination of implementations described below and/or in connection with one or more other processes described elsewhere herein.

In a first implementation, the status of the animal comprises a medical status of the animal as indicated by the animal records. In a second implementation, alone or in combination with the first implementation, the animal records are stored in the blockchain based on a plurality of events, and at least one of the plurality of events involve the animal and another entity that is different from the entity associated with the user device.

In a third implementation, alone or in combination with any one or more of the first and second implementations, the entity is verified based on an entity identifier associated with the entity being mapped to the animal record identifier.

In a fourth implementation, alone or in combination with any one or more of the first through third implementations, the entity is verified based on a type of the status and a characteristic of the entity, and the characteristic of the entity corresponds to the type of the status.

In a fifth implementation, alone or in combination with any one or more of the first through fourth implementations, the animal identification information comprises an image of the animal, and the animal record identifier is mapped to the image of the animal using an image processing technique.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, event information,
    wherein the event information is associated with an event involving an animal,
    wherein the event is associated with creating an account for the animal, and
    wherein the event information is received from a user device;
  obtaining, by the device and based on receiving the event information, animal identification information for the animal,
    wherein the animal identification information comprises at least one of:
      a biometric signature of the animal, or
      a microchip identification number associated with a microchip of the animal;
  determining, by the device, an animal record identifier for the animal,
    wherein the animal record identifier is determined based on the animal identification information, and
    wherein the account is identified by the animal record identifier;
  generating, by the device, an animal record associated with the event,
    wherein the animal record is to include the animal record identifier,
    wherein the animal record is generated using a private key,
      wherein the private key certifies that the animal record is associated with the user device, and
    wherein the animal record identifies information associated with a status of the animal according to the event;
  configuring, by the device, authorization settings for the animal record,
    wherein the authorization settings permit a plurality of authorized entities to access the animal record; and
  causing, by the device, the animal record to be stored in a distributed ledger system,
    wherein the distributed ledger system includes a plurality of animal records associated with a plurality of animals, and
    wherein one or more of the plurality of animal records are accessible to the plurality of authorized entities.

2. The method of claim 1, further comprising:
  generating an attestation based on the animal record to verify a certification of the animal corresponding to the event.

3. The method of claim 1, wherein the distributed ledger system includes a blockchain, and
  wherein the animal record is stored in a block of the blockchain.

4. The method of claim 1, wherein the authorization settings are configured based on at least one of a characteristic of the event or a characteristic of the animal.

5. The method of claim 1, wherein the event is associated with receiving medical treatment,
  wherein the user device is associated with a veterinary entity that provided the medical treatment, and
  wherein the status corresponds to a medical status of the animal.

6. The method of claim 1, wherein the event is associated with transporting the animal,
  wherein the user device is associated with an entity associated with enabling transportation involving the animal, and
  wherein the status identifies a location of the animal.

7. The method of claim 1, wherein the plurality of authorized entities include two or more of:
  a current owner associated with the animal,
  a prospective owner associated with the animal,
  a service provider associated with providing a service for the animal,
  an insurance provider associated with authorizing veterinary care for the animal,
  a transportation entity associated with enabling transportation involving the animal, or
  a real estate entity associated with a dwelling of the current owner of the animal.

8. The method of claim 1, wherein the animal identification information comprises an image of the animal, and
  wherein the animal record identifier is mapped to the image of the animal using an image processing technique.

9. A device, comprising:
  one or more memories; and
  one or more processors communicatively coupled to the one or more memories, configured to:
    receive event information associated with an event involving an animal;
    identify, based on receiving the event information, animal identification information for the animal,
      wherein the animal identification information is received in association with the event information;
    determine, based on the animal identification information, an animal record identifier for the animal,
      wherein the animal record identifier is determined using a mapping of the animal identification information to the animal record identifier;
    generate an animal record associated with the event to indicate a status of the animal according to the event; and cause the animal record to be stored in a distributed ledger system,
 wherein the distributed ledger system includes a plurality of animal records associated with a plurality of animals, and
 wherein one or more of the plurality of animal records are accessible to a plurality of entities.

10. The device of claim 9, wherein the animal identification information comprises a biometric signature of the animal.

11. The device of claim 10, wherein the biometric signature of the animal is based on an image of the animal.

12. The device of claim 9, wherein the animal identification information comprises a microchip identification number that is embedded within the animal.

13. The device of claim 9, wherein the plurality of entities are authorized to access the one or more of the plurality of animal records according to authorization settings of the one or more of the plurality of animal records.

14. The device of claim 9, wherein the event is associated with transporting the animal, and
 wherein the status identifies a location of the animal.

15. A non-transitory computer-readable medium storing instructions, the instructions comprising:
 one or more instructions that, when executed by one or more processors, cause the one or more processors to:
  receive, from a user device, a request for a status of an animal,
   wherein the request includes animal identification information associated with the animal;
  identify, based on receiving the request, an animal record identifier associated with the animal,
   wherein the animal record identifier is obtained based on the animal identification information;
  verify that an entity associated with the user device is authorized to obtain the status of the animal,
   wherein the entity is one of a plurality of entities that are authorized to obtain the status of the animal, and
   wherein the entity is verified based on an entity identifier associated with the entity being mapped to the animal record identifier;
  identify, based on verifying that the entity is associated with the user device, blocks of a blockchain that include the animal record identifier;
  determine the status of the animal from animal records associated with the animal,
   wherein the animal records are included within the blocks; and
  provide, to the user device, the status of the animal.

16. The non-transitory computer-readable medium of claim 15, wherein the status of the animal comprises a medical status of the animal as indicated by the animal records.

17. The non-transitory computer-readable medium of claim 15, wherein the animal records are stored in the blockchain based on a plurality of events, and
 wherein at least one of the plurality of events involve the animal and another entity that is different from the entity associated with the user device.

18. The non-transitory computer-readable medium of claim 15, wherein the entity is verified based on a type of the status and a characteristic of the entity, and
 wherein the characteristic of the entity corresponds to the type of the status.

19. The non-transitory computer-readable medium of claim 15, wherein the animal identification information comprises an image of the animal, and
 wherein the animal record identifier is mapped to the image of the animal using an image processing technique.

20. The non-transitory computer-readable medium of claim 15, wherein the status identifies a location of the animal.

* * * * *